United States Patent [19]

Terao et al.

[11] Patent Number: 5,458,993

[45] Date of Patent: Oct. 17, 1995

[54] NON-AQUEOUS ELECTROLYTE BATTERY AND METHOD OF MANUFACTURING SAME

[75] Inventors: Yoshiki Terao, Osaka; Satoshi Ogawa, Hirakata; Sakae Sadakuni, Takarazuka; Fumio Daio, Nara, all of Japan

[73] Assignee: Matsushita Electric Industrial Co., Ltd., Kadoma, Japan

[21] Appl. No.: 343,636

[22] Filed: Nov. 22, 1994

[30] Foreign Application Priority Data

Nov. 22, 1993 [JP] Japan ................................ 5-291738
Dec. 28, 1993 [JP] Japan ................................ 5-336149

[51] Int. Cl.⁶ ............................................. H01M 4/00
[52] U.S. Cl. ........................ 429/94; 429/164; 429/165; 429/218; 429/225; 429/233; 429/247; 429/194; 29/623.1; 29/623.2; 29/623.4; 29/623.5
[58] Field of Search ............................. 429/94, 164, 165, 429/218, 225, 233, 247, 194; 29/623.1, 623.4, 623.2, 623.5

[56] References Cited

U.S. PATENT DOCUMENTS 4,482,615 11/1984 Rosansky et al. .................. 429/94
4,622,277 11/1986 Bedder et al. ...................... 429/196
4,668,320 5/1987 Crabtree ............................. 429/94
5,008,165 4/1991 Schmöde ............................ 429/196
5,322,746 6/1994 Wainwright ....................... 429/218

FOREIGN PATENT DOCUMENTS 61-281465 12/1986 Japan .
61-281466 12/1986 Japan .

*Primary Examiner*—John Niebling
*Assistant Examiner*—Bruce F. Bell
*Attorney, Agent, or Firm*—Ratner & Prestia

[57] ABSTRACT

A non-aqueous electrolyte battery comprising a positive electrode plate and a negative electrode plate of a light metal spirally wound with a separator in between and an electrolyte, wherein said separator is a microporous membrane or a non-woven cloth provided with a non-ion-permeable insulating band on at least one side and in a direction along the length of, and in the middle of the width of said separator, or said positive electrode plate comprises manganese dioxide as the cathodic active material and is provided with a band of a manganese lower oxide thereon at the middle and in a direction along the length of the electrode plate, having not only superior high-rate discharge performance but also high capacity and reliability without affecting prior art manufacturing processes used to produce the battery.

13 Claims, 4 Drawing Sheets

NON-AQUEOUS ELECTROLYTE BATTERY AND METHOD OF MANUFACTURING SAME

BACKGROUND OF THE INVENTION

1. Field of the Invention

This invention relates to a non-aqueous electrolyte cylindrical primary battery having high-rate discharge characteristics comprising a strip-like positive plate including manganese dioxide or graphite fluoride as the cathodic active material and a strip-like negative plate of lithium or other such light metal as the anodic active material spirally wound with a separator in between to form an electrode assembly, and an organic electrolyte.

2. Description of the Prior Art

Non-aqueous electrolyte batteries using a light metal such as lithium as the anodic active material have various advantages such as superior low temperature performance, wide working temperature range, less self-discharge, but have been inferior in high-rate discharge characteristics. The non-aqueous electrolyte cylindrical primary battery with a spirally wound electrode plate structure (group) was developed for long-life use in automatic-focusing still cameras so as to function properly under high-rate discharging by the motor driven focusing, film advancing and rewinding or electronic flash lighting.

The electrodes positive and negative, of this type of cell are prepared usually as a long thin band. The positive electrode is fabricated by filling a core material of expanded or punched metal sheet with a high density positive mixture consisting of cathodic active material, conductive material, binder etc. In recent years, the negative electrode for a primary battery with the negative electrode of lithium, a simple type consisting of high conductivity lithium foil with a lead plate fixed at a required location has been used instead of a lithium foil pressed into the entire surface of a skeleton of expanded metal provided with a lead plate as was first developed. Such a structure, results in increased quantity of cathodic active material and low cost.

The positive and negative electrodes described above are wound with a separator of microporous polyolefin (polypropylene and/or polyethylene) membrane to form a spirally wound electrode plate group. This structure results in an increased area of the positive and negative electrodes and the current density being substantially lowered, resulting in high reaction efficiency of both the positive and negative electrodes during high-rate discharging.

In recent years, the use of such a battery has been expanded, not only for AF cameras, but also for various other devices such as town gas, water supply, or electric power supply meters for electronic devices such as communication equipment, measuring equipment, or for semiconductor back up memories. Accordingly, the pattern of the discharge of the battery has become varied, e.g. continuous discharging in a weak current of a microampere order, low-rate discharging with occasional high-rate discharges as necessary for the operation of electromagnetic valves.

Referring to FIG. 1, there is shown a top plain view of an electrode plate structure (group) spirally wound as previously described, the group comprising a negative electrode 1, negative electrode lead plate 1a, positive electrode plate 2, positive electrode lead plate 2a, separator 3, with a space 4 in the center. As a result of investigation, the negative electrode lead plate 1a is fixed at a portion of the positive electrode plate 2 a short distance inside from the outermost end 2b of positive electrode plate 2, in order to obtain higher reaction efficiency of anodic active material in the high-rate discharge mode. Although not shown in the drawing, the negative electrode lead plate 1a, positive electrode lead plate 2a, and the outermost end 2b of the positive electrode 2 are provided with a cover of insulating adhesive tape, to prevent internal short circuiting due to irregular surface projections.

In general, the battery has higher reaction efficiency or utilization of active materials of both the positive and negative electrodes and a high discharge capacity, when used in low-rate as opposed to high-rate discharging. Conventional non-aqueous electrolyte cylindrical battery with superior high-rate-discharge characteristics, at the low-rate discharge, did not always indicate higher capacity but sometimes did show inconsistency. Observing many batteries disassembled after low-rate discharging, it was learned that the negative electrode plates of lithium were not uniformly reacted by discharge, some parts were completely dissolved and extinguished, while other parts partially reacted to become thinner, or parts not reacted remained as they were, leaving the lithium foil in pieces, as shown in FIG. 5. In FIG. 5, the outline 51 of the original negative electrode plate proper of lithium is seen, with the remaining parts shown outlined by solid lines and the parts which have vanished by no cross-hatching. The parts having oblique cross-hatching are those which have remained as lithium metal after low-rate discharge. The portion of the negative electrode lead plate 51a is fixed to the electrode plate 51 and is covered with an insulating adhesive tape 51b thus preventing contact with the electrolyte, leaving the lithium foil not dissolved or consumed. Neither the outermost end 51c of the negative electrode plate nor the part 52d and 52c facing the lead-plate-fixing part of the positive electrode with the adhesive tape in between or the portion of the tape 2b (as shown in FIG. 1) was dissolved or consumed. The portion 51d forming the outermost part of the electrode group having one surface facing the positive electrode was dissolved at the inner side which faces the positive electrode but the lithium foil on the opposite side has been left unchanged. The part 51f is considered to have remained in the metal state until the end of discharge, if the current density was low and the discharge reaction was delayed. What is remarkable on all of the negative electrode plates of the conventional batteries is that the part of the lithium foil between the mounting point of the negative lead plate and the part facing the mounting point of the positive lead plate with separators in between are by and large dissolved causing the foil to divide. This is attributed to the high current density at the lead-fixing points of the positive or negative electrode plates. As shown in FIG. 5, the lithium foil of the negative electrode after the discharge has its peripheral edges dissolved away with metal pieces remaining, which were separated from the negative electrode lead plate 51a naturally terminating electrical connection therewith and accordingly failing to contribute to the reaction at its last phase.

Thus, the unexpected low capacity of the conventional battery under low-rate discharge is considered due to incomplete use of the lithium metal when used as a negative electrode. Such phenomena is more prominent in the case of the negative electrode capacity being nearly equal to or less than the positive electrode capacity. Thus, to improve the low-rate discharge performance of the non-aqueous electrolyte cylindrical battery having a negative electrode plate of lithium foil provided with a lead plate fixing location for high-rate discharge use, it is important to have the lithium foil not separate from the lead plate to maintain the electrical connection until the end of the discharge.

In order to solve the problem of the conventional batteries proposed solutions are disclosed in Japanese patent applications Laid-open No. Sho 61-281465 and Sho 61-281465, for example. The former application discloses provisions of a groove on the positive electrode of strip disposed along the winding direction of the electrode, and the latter application teaches putting an insulating layer on the negative electrode of lithium by applying, in the winding direction, an insulating adhesive tape or a covering of an insulating paint. However, the first disclosure could not be applied to the positive electrode plate having a core material such as an expanded metal or a net which are cubic and have good adhesion to the positive electrode mixture, due to the difficulty of forming a groove in the electrode. Also, a positive electrode plate formed from a perforated core sheet such as a punched metal with a groove formed thereon, has a shortcoming in that the mixture filling the core partially dropped when the electrode was wound up, often resulting in internal short circuiting of the battery.

In regard to the second invention, it is necessary, to form an insulating layer on the lithium foil by applying the tape in dry, inert, low-temperature atmosphere, or, to dry after the application of the paint, because of reaction of the foil with water, etc. both resulting in processing difficulties.

SUMMARY OF THE INVENTION

In view of the foregoing, it is an object of the present invention to provide a non-aqueous electrolyte battery, which is not only superior in high-rate discharge characteristics but also of high capacity with small tolerances and reliable in low-rate discharge without any of the disadvantages in production as found with conventional batteries.

To attain the above objects and other advantages, a non-aqueous electrolyte battery having an electrode plate structure composed of a negative band electrode plate of a foil of light metal such as lithium with a lead plate as a current collector and a positive electrode plate in the form of a band wound with a band separator in between in a spiral form together with an organic electrolyte is provided. According to the present invention, a non-ion-permeable insulation band is disposed continuously or intermittently on at least one surface of the separator and at a location in the middle of the width of the separator in order to cross the lead plate and the part of the negative electrode plate facing the separator with high current density when the battery is discharged.

DETAILED EXPLANATION OF THE INVENTION

Figure 1:
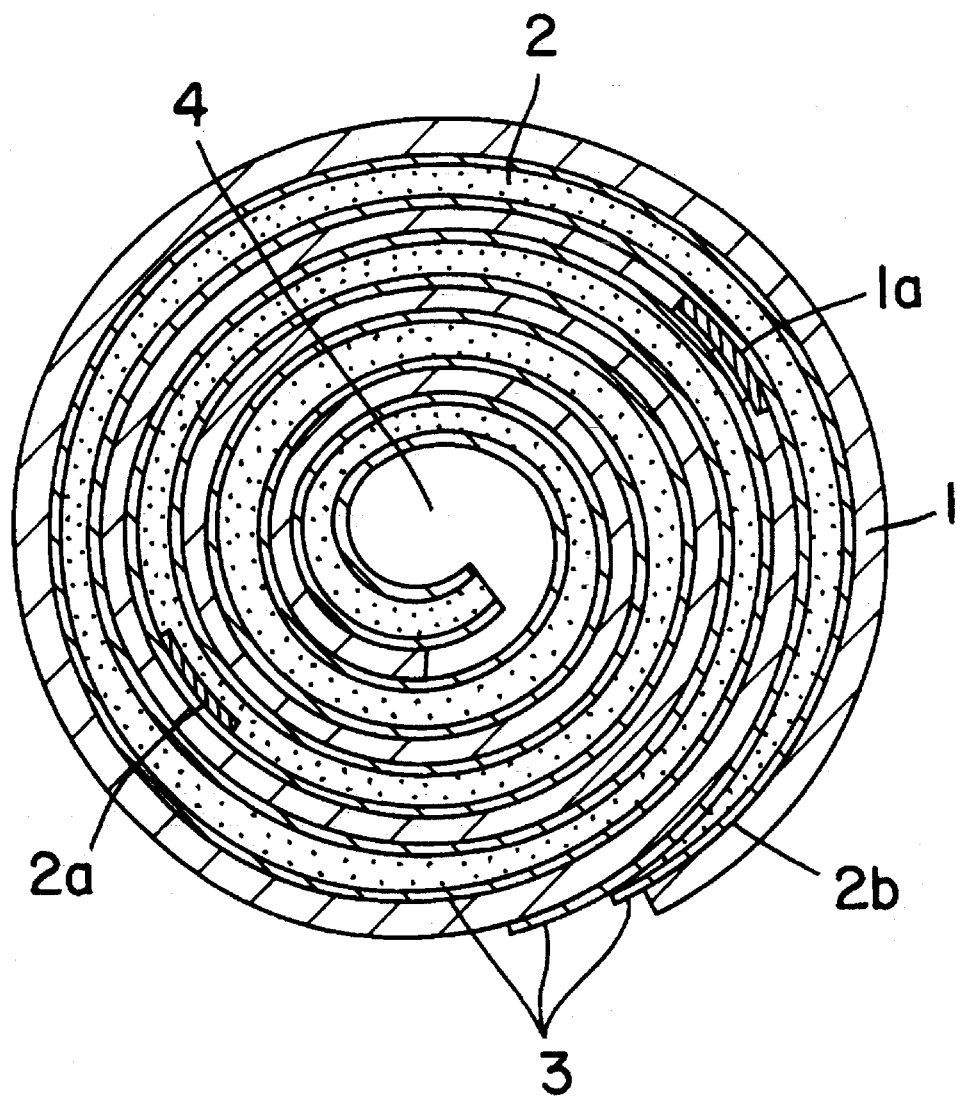
FIG. 1 is an enlarged top plan view of an electrode plate structure formed by spiral winding according to the present invention.

In the following, the present invention is explained in detail by referring to the drawings.

EXAMPLE 1

Figure 2:
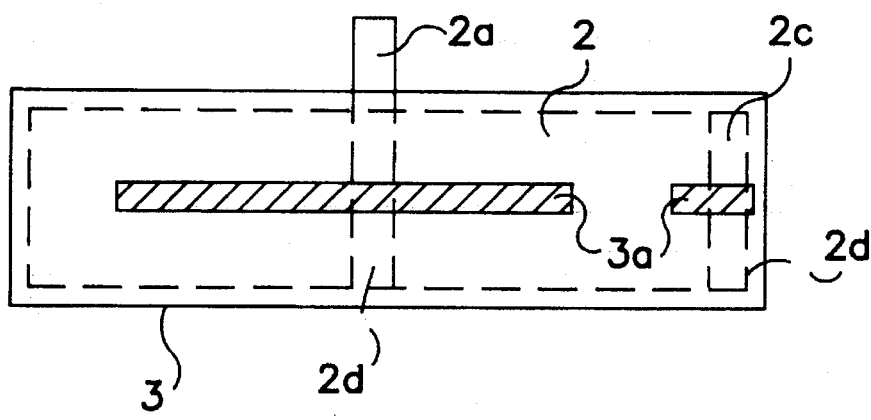
FIG. 2 is a top plan view of a separator provided with an insulating band part to face the positive electrode.

Referring to FIG. 2, a positive electrode mixture is prepared by mixing 90 weight % manganese dioxide ($MnO_2$) prepared by dehydrating electrolytic manganese dioxide at 400° C., as the cathodic active material, 8 wt % of carbon black as the conductive material, and 2 wt % of PTFE (polytetrafluoroethylene) as the binder. The grid of positive electrode 2 of expanded stainless steel is filled with the mixture under pressure, and is cut to form a desired band shape. A portion of the mixture is removed to expose the middle portion of the grid. A lead plate 2a is welded to the exposed portion of the grid, and insulating adhesive tapes 2d and 2c are applied on the portion of the positive electrode lead plate 2a fixed to the grid, and on both sides of the end 2b of the positive electrode plate to define the outermost end when it is wound to form an electrode plate structure or assembly. A negative electrode plate (not shown) is fabricated from a lithium foil with a width slightly smaller than the positive electrode plate. The negative electrode is provided with a lead plate pressed into its surface, with the portion of the lead plate fixed to the electrode covered completely with an insulating adhesive tape. Although the lead plate of the negative electrode may cover the width of the lithium foil, about ⅔ of the width of the foil from the lower end is sufficient.

A microporous polypropylene membrane of 10–50 μm thickness was employed as the separator. As shown in FIG. 2, the separator 3 is wider than the positive electrode plate 2 and of a length sufficient to cover the surface of the positive electrode plate. Disposed in the middle of the width on at least one surface of the separator covering the surface of the positive electrode plate having a width of one millimeter or slightly wider are insulating tapes 3a of polypropylene positioned to cross the adhesive tapes 2d and 2c which have been deposited on the lead plate 2a and on the outermost end 2b respectively. The insulating tape 3a shown in FIG. 2 in two parts may be one length covering a portion the separators. It is important that the insulating adhesive tape 3a is applied so as to cross, continuously or in pieces, the lead plate 2a and the part of the negative electrode plate having high discharge current density facing the positive electrode plate 2 with a separator 3 in between.

The positive electrode plate 2 and negative electrode plate 1 are spirally wound, as shown in FIG. 1, with a separator 3 having a non-ion-permeable band-insulator such as an insulating adhesive tape 3a in between to form an electrode structure or assembly. Since, as described above, the negative lead plate is fixed on the lithium foil covering at least ⅔ of the width, the non-ion-permeable band-insulator, previously deposited on the separator, results in the band insulator crossing the lead plate and the part with high current distribution of the negative electrode plate.

A battery A according to the present invention was fabricated by putting the above described spiral electrode plate assembly in a container, adding electrolyte, and tightly closing the container. For comparison, a conventional battery B was prepared with a positive electrode plate, negative electrode plate and other material and parts and assembled the same as in battery A, but without the usual membrane separator having an insulating band. Both battery A and B were filled with an electrolyte consisting of 1 mol/l lithium trifluoromethane sulfonate mixed with an equal volume of a solvent of propylene carbonate and 1,2-dimethoxy ethane solution. Battery A and B were of the type CR123A (diameter 17.1 mm, height 34.5 mm, and nominal capacity 1300 mAh).

Figure 3:
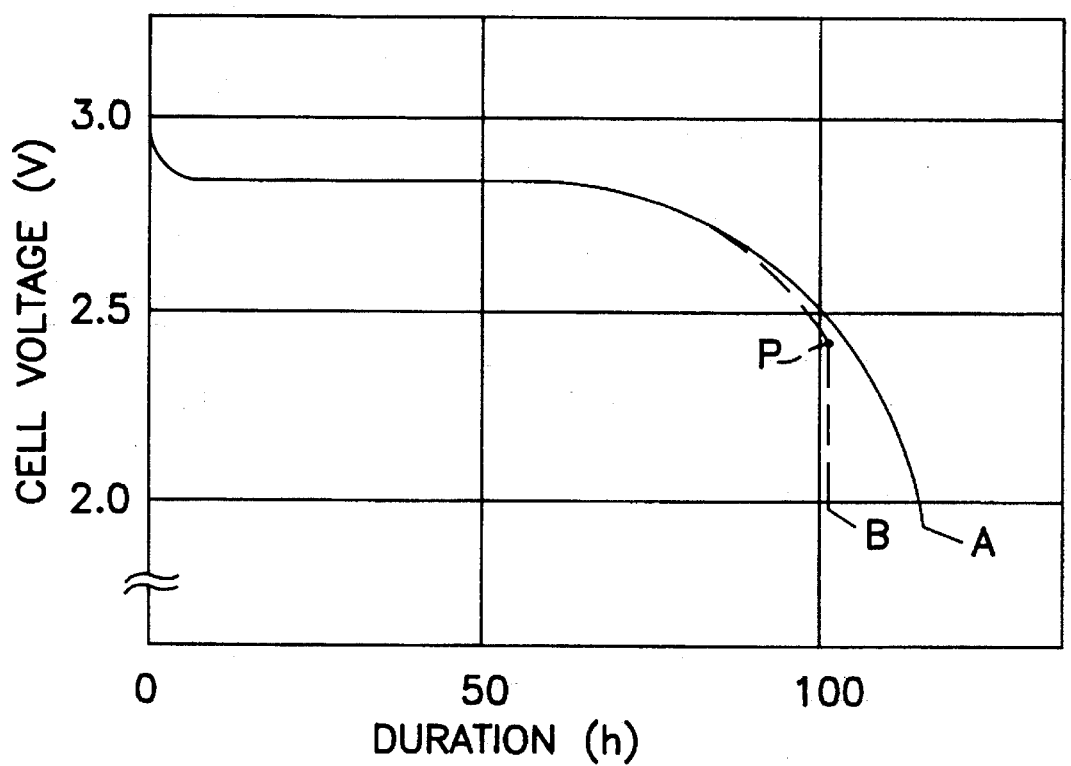
FIG.3 is a graph showing the discharge characteristics, i.e. cell voltage (V) against duration(h), for an example of a battery according to the present invention compared with that of a conventional battery.
Figure 5:
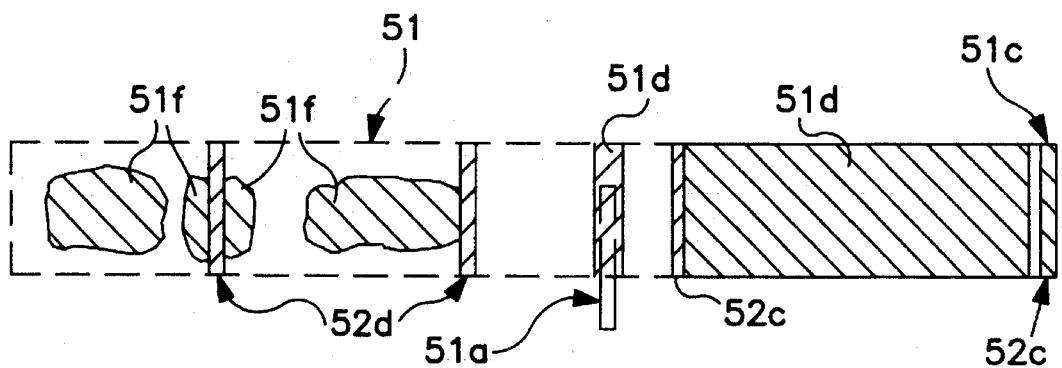
FIG. 5 is a plan view of a negative electrode plate of a battery according to the prior art shown uncoiled after low-rate discharge.

The batteries A and B were discharged continuously with a 200Ω constant resistance load with the results shown in FIG. 3. As shown in FIG. 3, battery A of the present invention is of higher capacity than the conventional battery B. The conventional battery B had rapid voltage drop moment at the point P of the last stage. Disassembling the battery B after the discharge and inspecting the negative electrode, the lithium foil of the negative electrode was found to be split similar to that shown in FIG. 5, showing the sudden voltage drop and decrease in capacity at the instant the electrical connection of the negative lead plate and the lithium foil was lost.

Figure 4:
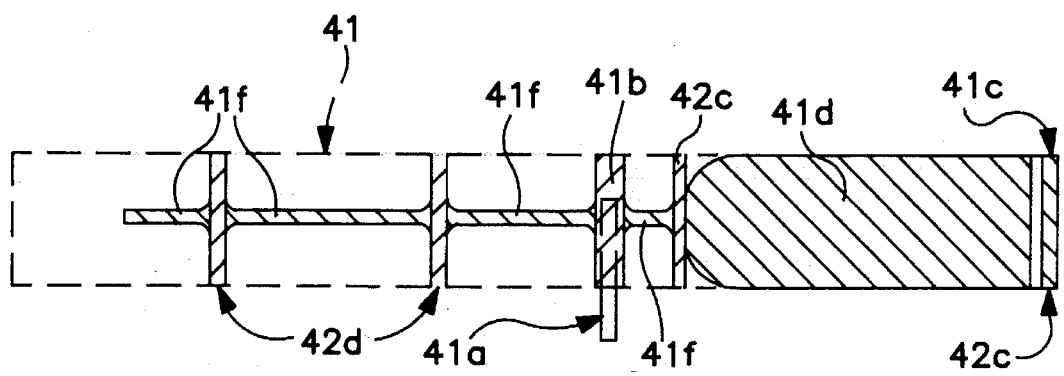
FIG.4 is a top plan view of a negative electrode plate of a battery according to the invention shown uncoiled after low-rate discharge.

The negative electrode plate removed from battery A of the present invention after the discharge is shown in FIG. 4. FIG. 4 should be compared to FIG. 5, with reference to the outline on contour 41 of the negative electrode plate proper. It was observed that the part of the negative lead plate 41a fixed to the electrode plate and covered by an insulating adhesive tape 41b, both sides of the outermost end part 41c of the electrode plate, which don't face the positive electrode plate, the parts 42c and 42d, which face the insulating adhesive tape on the lead plate 2a (as shown in FIG. 1) and the outermost end of the positive electrode with the separator in between, and the part 41d, of which only one side faces to the positive electrode plate with the separator in between were not dissolved. The electrode of battery A is clearly different from that of the conventional battery B shown in FIG. 5 in particular the part 41f of the lithium band survived thus maintaining the electrical connection between the lithium foil or the negative electrode proper and the negative electrode lead plate even after the end of discharge, and consumption of a large area of the foil caused by the discharge. Thus, the high utilization of the active lithium metal of the negative electrode results in increase in capacity which can easily be understood.

Instead of making the insulating band from polypropylene tape with no ion-permeability in Example 1, the band can be made from a point film of insulating resin insoluble in the electrolyte, or by a printing, and drying process.

It has been proposed in the specification of Japanese patent application Laid-open No. Sho 63-202859, in order to prevent internal short circuiting due to the slippage of the positive and negative electrode plates while they are spirally wound with a separator in between to form an electrode assembly, to prepare a separator from a microporous polyolefin (polypropylene and/or polyethylene) membrane provided with a non-woven cloth of polyolefin fibre fastened at more than two points thereon by melting, having fixed thereon by pressing a lithium foil provided with only a lead plate to form a negative electrode plate and a separator combined as one body or unit, with the separator and negative electrode spirally wound with a positive band electrode plate. A non-permeable band in the form of an insulating adhesive tape or a point film can be placed on the non-woven cloth fixed on the separator, negative electrode plate is fixed to the lithium foil, this improvement according to the present invention may be incorporated into a battery without changing the conventional assembly line.

Further, the cathode active material is not limited to $MnO_2$ as set out in Example 1. Other active material may have the same effect, e.g. graphite fluorinated, copper oxide, etc.

EXAMPLE 2

Figure 6:
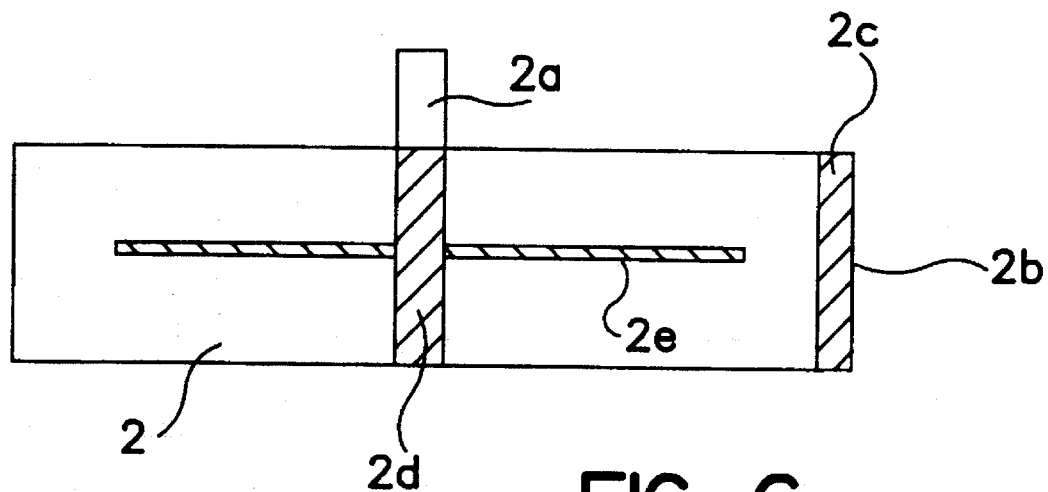
FIG. 6 is a top plan view of another example of a positive electrode plate according to the present invention.

As in Example 1, a positive electrode plate is prepared by pressing a positive electrode mixture including $MnO_2$ as the cathode active material into its grid structure, cutting the band to a shape of desired dimensions, applying heat to a part of the middle of the band in a direction along the length of the band using a heat source such as an electric heating wire of 1 mm width, to decompose the cathode active material $MnO_2$ to form a band of manganese sesquioxide $Mn_2O_3$. Then, as in Example 1, a lead plate is fixed to the electrode plate and insulating adhesive tape placed on the lead plate as well as on the outermost end of the electrode plate, to form a positive electrode plate, such as shown in FIG. 6. Referring to FIG. 6, a positive electrode plate 2 is provided with a band portion 2e of $Mn_2O_3$, a lead plate 2a, and the outermost end 2b which forms the outermost part when assembled to form an electrode assembly. Both the lead plate 2a and both sides of the end 2b of electrode plate 2 are provided with insulating adhesive tape 2d and 2c respectively. The band portion 2e of $Mn_2O_3$ may extend to the very end of the positive electrode, although it terminates short of the end as shown in FIG. 6. A battery of the type shown in Example 1 was fabricated using the above described positive electrode plate and a conventional microporous polypropylene membrane as the separator.

The battery was tested with continuous discharging with a 200Ω constant resistance load, and showed similar characteristics as battery A in Example 1. Inspecting the negative electrode plate of the battery after discharge, there remained a strip shaped portion of metallic lithium facing the $Mn_2O_3$ band with the separator in between to keep the electrical connection between the negative lead plate and the lithium foil up to the end of the discharge. A manganese lower oxide such as $Mn_2O_3$ having lower potential compared with $MnO_2$, which is the main active material in a positive electrode plate, can not participate in the discharge reaction until the $MnO_2$ is finished in the discharge reaction when the capacity of the battery is exhausted. Accordingly, the lithium foil of the negative electrode facing part of the manganese lower oxides was not dissolved or consumed, remaining as a metallic lithium band.

Making a manganese lower oxides band in mass production of the positive electrode plate continuously as a long strip, it is more efficient to use, laser beam as the heat source instead of an electric heater. The width of the manganese lower oxide band may be more precisely controlled with the laser beam. As the thermal decomposition of $MnO_2$ to $MnO_3$ in the atmosphere occurs at 553° C., the output and the scanning speed of the beam are adjusted to have the surface temperature of the positive electrode plate set at 550° to 650° C.

Figure 7:
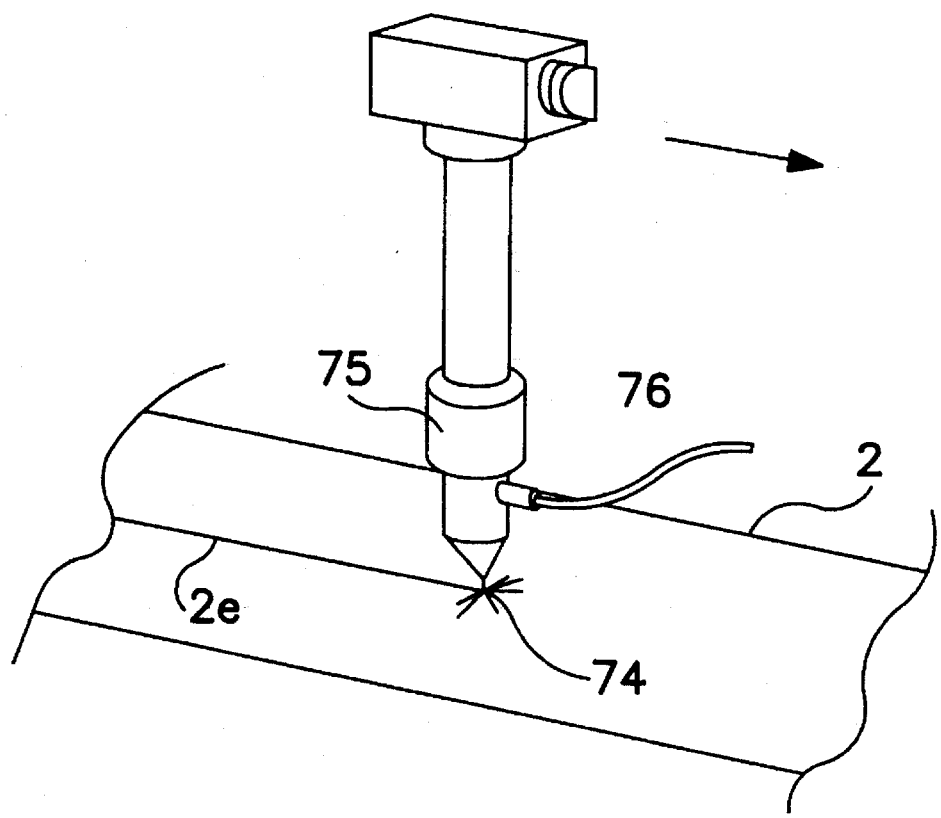
FIG. 7 is a partial perspective view showing a process of forming a manganese lower oxides band on a positive electrode plate according to a second example of the present invention.

Referring to FIG. 7, a carbon dioxide gas laser apparatus 75 with a pipe 76 for nitrogen as an assistant gas, moves in the direction shown by the arrow and projects a laser beam 74 onto the positive band electrode plate 2, to continuously form a band 2e of manganese lower oxide. Instead of moving the laser apparatus, the positive electrode band plate may be moved with the apparatus stationary. A laser output of from 3 to 8 watts decomposes $MnO_2$ to form $Mn_2O_3$. An output over 8 watts is dangerous, for the carbon black in the positive electrode mixture may ignite. If, on the other hand, the output is less than 3 watts, the temperature does not rise to the decomposition temperature of $MnO_2$.

Instead of the above carbon dioxide laser, a YAG laser is also applicable. In this case, an output of 10 to 30 watts creates a similar effect.

As explained in detail, a non-aqueous electrolyte cylindrical battery for high-rate discharge, according to the present invention, comprising a negative electrode plate of band shape of a light metal such as lithium with a lead plate as a collecting member, a positive electrode plate of band shape wound spirally with a band separator in between to form an electrode plate group, and an organic electrolyte, is provided with a non-ion-permeable insulating band on said separator in a direction along its length, or a band of a manganese lower oxide, continuous or separated, is placed on the positive electrode plate having $MnO_2$ as cathodic active material, resulting in a superior performance such as the increase of low-rate discharge and no decrease of the capacity of the battery, without reducing the efficiency of the conventional manufacturing process, or alteration of the assembly line.

What is claimed:

1. A non-aqueous electrolyte battery comprising a strip positive electrode plate and strip negative electrode plate of a light metal with a lead plate spirally wound with a strip separator in between, and an electrolyte, wherein said separator is of a microporous membrane or a non-woven cloth provided with a non-ion-permeable band-shape insulating part, disposed on at least one side along the length of the separator in the middle of the width thereof.

2. A non-aqueous electrolyte battery according to claim 1, wherein said non-ion-permeable insulating part is formed by attaching an insulating adhesive tape to said separator or by laying and drying an insulating paint on said separator.

3. A non-aqueous electrolyte battery of claim 1, wherein said microporous membrane and non-woven cloth are of polyolefin.

4. The method of manufacturing a non-aqueous electrolyte battery of claim 3, wherein said non-ion-permeable insulating part is formed by applying an insulating adhesive tape to said separator or by laying and drying an insulating paint on said separator.

5. The method of manufacturing a non-aqueous electrolyte battery of claim 3, wherein said microporous membrane separator and said non-woven cloth welded on said separator are of polyolefin.

6. A non-aqueous electrolytic battery comprising a strip positive electrode plate and a strip negative electrode plate of lithium foil with a lead plate fixed to said negative electrode plate and a strip separator of microporous membrane with a non-woven cloth fixed thereon at specific points, said negative electrode plate and said non-woven cloth being combined to form one body spirally wound with said separator between said electrode plates to form an electrode plate assembly and an organic electrolyte, wherein said non-woven cloth is provided with a non-ion-permeable band-shaped insulating part on at least one side, in a direction along the length of said separator in the middle of the width thereof.

7. A non-aqueous electrolyte battery according to claim 6 wherein said non-ion-permeable insulating part is formed by attaching an adhesive tape to such separator or by laying and drying an insulating paint on said separator.

8. A non-aqueous electrolyte battery according to claim 6 wherein said microporous membrane and non-woven cloth are of polyolefin.

9. A method of manufacturing a non-aqueous electrolyte battery comprising the steps of:

forming a non-ion-permeable band-shaped insulating part on at least one side of a non-woven cloth, welding said non-woven cloth on a strip microporous membrane separator at a plurality of points at the middle of the width thereof and in a direction, along the length of said separator, pressing said non-woven cloth on a strip negative electrode plate of lithium foil with a lead plate to form one body, spirally winding said negative electrode plate and a strip positive electrode plate with said separator in between to form an electrode plate assembly, placing said electrode plate assembly in a container, pouring an organic electrolyte in said container; and sealing said container.

10. A non-aqueous electrolyte battery comprising a strip negative electrode plate of light metal foil with a lead plate and a strip positive electrode plate with manganese dioxide as the cathodic active material spirally wound with a separator in between to form an electrode plate assembly and an organic electrolyte; wherein said positive electrode plate is provided with a band of a manganese lower oxide thereon at the middle and in a direction along at least a portion of the length of said separator.

11. A method of manufacturing a non-aqueous electrolyte battery comprising the steps of:

preparing a strip positive electrode plate having manganese oxide as the cathodic active material, and a strip negative electrode plate of light metal foil having a lead plate, projecting a laser beam on said electrode plate to form a band of a manganese lower oxide thereon at the middle and in a direction along at least a portion of the length of said separator, spirally winding said positive electrode plate and negative electrode plate with a band separator in between to form an electrode plate assembly, putting said electrode plate assembly in to a battery container, pouring an organic electrolyte into the container, and sealing said container.

12. The method of manufacturing a non-aqueous electrolyte battery of claim 11, wherein said laser beam is obtained by a carbon dioxide gas laser apparatus or by YAG laser apparatus.

13. The method of manufacturing a non-aqueous electrolyte battery of claim 11, wherein the power of said laser beam is 3 to 8 watts for the carbon dioxide laser apparatus and 10 to 30 watts for YAG laser apparatus.

* * * * *